(12) United States Patent
Da Silva et al.

(10) Patent No.: US 8,544,799 B2
(45) Date of Patent: Oct. 1, 2013

(54) VORTEX GENERATORS TO IMPROVE PERFORMANCE OF FLUSH AIR INLETS

(75) Inventors: Luis Fernando Figueira Da Silva, Rio de Janeiro (BR); Sandro Barros Ferreira, Rio de Janeiro (BR); Cesar Celis Perez, Rio de Janeiro (BR); Guilherme Lara Oliveira, San Jose dos Campos (BR); Antonio Batista De Jesus, San Jose dos Campos (BR)

(73) Assignee: Embraer S.A., Sao Jose dos Campos-SP (BR)

( * ) Notice: Subject to any disclaimer, the term of this patent is extended or adjusted under 35 U.S.C. 154(b) by 651 days.

(21) Appl. No.: 12/526,853

(22) PCT Filed: Feb. 15, 2008

(86) PCT No.: PCT/BR2008/000045
§ 371 (c)(1),
(2), (4) Date: Jul. 21, 2010

(87) PCT Pub. No.: WO2008/098332
PCT Pub. Date: Aug. 21, 2008

(65) Prior Publication Data
US 2011/0042518 A1    Feb. 24, 2011

(30) Foreign Application Priority Data
Feb. 15, 2007 (BR) ...................................... 0700765

(51) Int. Cl.
*B64C 1/38*    (2006.01)

(52) U.S. Cl.
USPC ................. 244/130; 244/200.1; 244/53 B (58) Field of Classification Search
USPC ................. 244/200.1, 199.1, 1 N, 130, 53 B
See application file for complete search history.

(56) References Cited

U.S. PATENT DOCUMENTS 4,444,367 A * 4/1984 Spillman .................. 244/199.1
4,836,473 A   6/1989 Aulehla et al.

OTHER PUBLICATIONS

International Search Report for PCT/BR2008/000045, mailed Aug. 25, 2008.
Written Opinion of the International Searching Authority for PCT/BR2008/000045, mailed Aug. 25, 2008.

* cited by examiner

*Primary Examiner* — Timothy D Collins
*Assistant Examiner* — Brian M O'Hara
(74) *Attorney, Agent, or Firm* — Nixon & Vanderhye P.C.

(57) ABSTRACT

A VG (vortex generator) placed on a body surface (aircraft or similar), upstream of a flush air inlet, in order to generate vortexes that will sweep away the boundary layer in front of the inlet, inducing a downwash effect in the freestream airflow, such VG consisting of a wing (1) parallel to the surface of the aircraft or similar, said wing supported by a support (2) or a pair of supports (2) such as fins disposed in a divergent angle; the VG considerably improves the inlet ram recovery ratio and the mass flow ratio of the air inlet and it has an effect of reduction of the VG boundary layer thickness, thus reducing the distortion level of the flow entering the inlet as the inlet ingests more freestream air and the vortexes are not ingested by the inlet.

10 Claims, 11 Drawing Sheets

VORTEX GENERATORS TO IMPROVE PERFORMANCE OF FLUSH AIR INLETS

This application is the U.S. national phase of International Application No. PCT/BR2008/000045, filed 15 Feb. 2008, which designated the U.S. and claims priority to Brazilian Application No. PI0700765-5, filed 15 Feb. 2007, the entire contents of each of which are hereby incorporated by reference.

The present invention refers to a constructive disposition for a vortex generator applied close to an air inlet, the disposition having aerodynamic characteristics making possible that the air inlet have greater efficiency while it contributes to the general performance of the equipment possessing said air inlet.

INTRODUCTION TO THE TECHNICAL ASPECTS OF THE INVENTION

Aircraft use air inlets for different applications like providing airflow to propulsion systems (engine and APU) or air-conditioning systems. Air inlets are also used as a means to promote cooling and ventilation wherever it is needed and particularly for propulsion systems.

Figure 1:
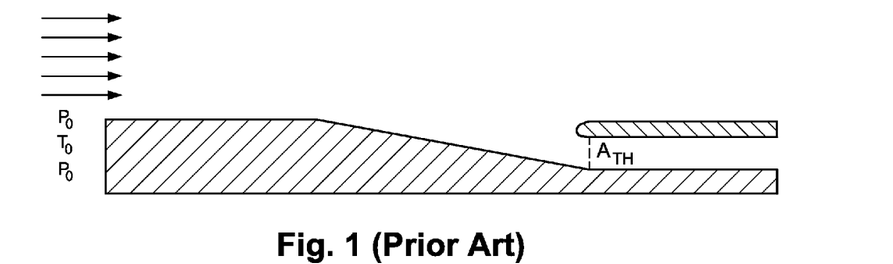
FIG. 1—A schematic of a flush type inlet of the state of art.

A commonly used air inlet is the so-called flush inlet, which consists in a ramp that is used to deviate the external air flowing around the aircraft to its internal region. FIG. 1 shows a schematic of a flush type inlet installed on a flat region, which represents a portion of the fuselage, nacelles, wings or empennages of an aircraft, where the inlet is installed. The external airflow is indicated by the arrows, while the air inlet geometry is represented by the ramp, the leading edge and the throat area ($A_{TH}$) which is the internal section of the inlet duct.

One of the key parameters for the design of any air inlet is its efficiency or ram recovery ratio, which can be defined as the ratio between the dynamic pressure of the flow on the inlet throat and the dynamic pressure of the flow at freestream conditions:

$$\eta_{fl} = \frac{p_{t_{TH}} - p_0}{p_{t_0} - p_0} \quad (1)$$

where $p_t$ is the total pressure and p is the static pressure.

The variation of the ram recovery ratio of an air inlet is usually expressed as a function of the mass flow ratio, MFR, which is defined as the ratio between the actual mass flow rate ingested by the inlet and the reference value, $\dot{m}_0$, which corresponds to the maximum theoretical value that would be ingested by the intake at freestream conditions:

$$\dot{m}_0 = \rho_0 V_0 A_{TH} \quad (2)$$

where $\rho_0$ is the air density, $V_0$ is the flow velocity, and $A_{TH}$ is the area of the throat inlet.

Another important parameter is the total drag coefficient ($C_{Dfl}$), which results from the addition of two terms, the ram drag and the spillage drag. It is defined as follows:

$$C_{Dfl} = \frac{D}{(p_{t_0} - p_0) A_{TH}} \quad (3)$$

In this equation (3), D is the total drag, which is the component force at the direction of the freestream flow, and ($p_{t_0} - p_0$) is the dynamic pressure of the freestream flow. In the equations (1), (2), and (3), the subscript "0" denotes freestream conditions and "TH" denotes the flow conditions at the inlet throat as indicated in FIG. 1.

Depending on the application it is also important to consider the pattern of the airflow at the inlet throat section, which is usually measured by the degree of non-uniformity of the total pressure at the inlet throat section (the so-called inlet distortion).

A flush type air inlet is generally the first choice for any aircraft application because of its low drag characteristics. However, in many cases the use of a flush type inlet is limited by the fact that the ram recovery ratio of such inlets is strongly determined by the boundary layer of the airflow upstream. Depending on the boundary layer thickness a flush air inlet will ingest the low-energy portion of the airflow closer to the wall, which may lead to undesirably small ram recovery ratios and mass-flow ratios. One alternative to that would be the use of another type of air inlet, the scoop type inlet, which is protruding to the external airflow, out of the low energy portion of the boundary layer. The scoop inlet would increase the values of ram recovery ratio and mass flow ratio when compared to the flush inlet but with a penalty of a much larger drag coefficient. In addition, scoop inlets are generally heavier and its installation requires a more robust structure. Those factors would also cause that, in existing applications, the substitution of a flush inlet by a scoop inlet would be prohibitively expensive in terms of materials and time.

Another alternative would be to modify the external airflow upstream of the flush inlet by energizing the boundary layer and reducing its thickness. As the boundary-layer thickness is the main parameter governing the efficiency of the flush air inlet, any means of reducing it upstream of the air inlet can be used to increase the ram recovery ratio and the mass flow ratio. One way to cause that effect is to generate vortexes in the direction of the main external flow such that the vortexes induce a downwash effect that brings the external air, with more energy, closer to the surface, reducing the boundary-layer thickness. Vortexes generation upstream of a flush air inlet can be accomplished by means of a so-called vortex generator (VG), which is a device that can be designed and integrated with the air inlet in many different ways but that generally tend to increase the ram recovery ratio and the mass flow ratio, producing less drag than a scoop type inlet with similar characteristics and with a configuration suitable for retrofit.

The current invention is related to the second alternative, which means conceiving a device to generate vortexes upstream of a flush air inlet in order to increase the ram recovery ratio and mass flow ratios of flush type inlets.

BRIEF DESCRIPTION OF DRAWINGS

The present invention will be briefly explained based in execution examples represented in the drawings. The figures are.

DESCRIPTION OF THE STATE OF ART

As it was already mentioned, the design and integration of a VG with a flush inlet in order to improve the ram recovery and mass flow ratios can be performed in a variety of ways and that is reflected in the patents related to similar devices that could be found during the search on patents databanks.

Figure 2:
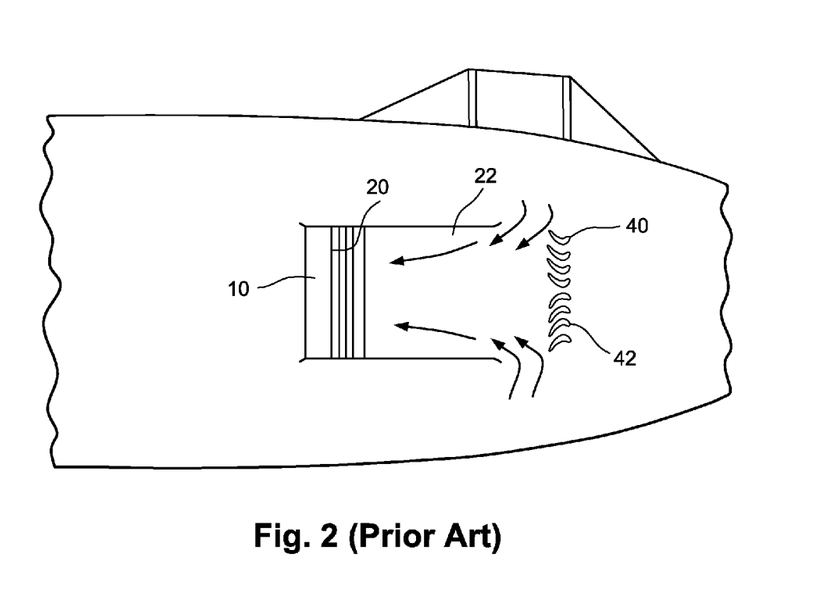
FIG. 2—A set of fins mounted in front of a flush air inlet of the state of art (U.S. Pat. No. 2,694,357)

U.S. Pat. No. 2,694,357 filed in 18 Jul. 1950, describes a set of devices to generate vortexes upstream of flush inlets, such as fins mounted on the aircraft surface and airfoil or wing sections mounted on struts that are attached to the airframe. Those devices are located close to the inlet opening and generate vortexes that produce a downwash effect in the airflow upstream of the inlet, reducing the boundary layer thickness and improving the inlet efficiency. The patent also describes the use of turning vanes in order to improve flow characteristics inside ducts that usually follow the air inlets. For clarification purposes, FIG. 2 and FIG. 3 bring some drawings from the original patent document. FIG. 2 shows a set of fins mounted in front of a flush air inlet, while FIG. 2 shows the wing mounted on a strut in front of the inlet.

Figure 3A:
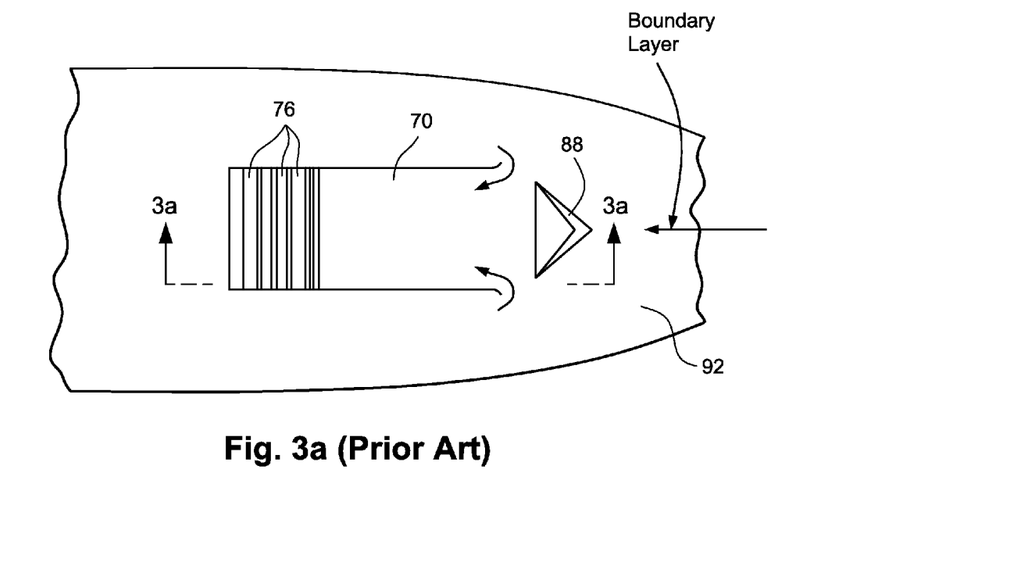
FIG. 3—A wing mounted on a strut in front of the inlet of the state of art (U.S. Pat. No. 2,694,357)
Figure 3B:
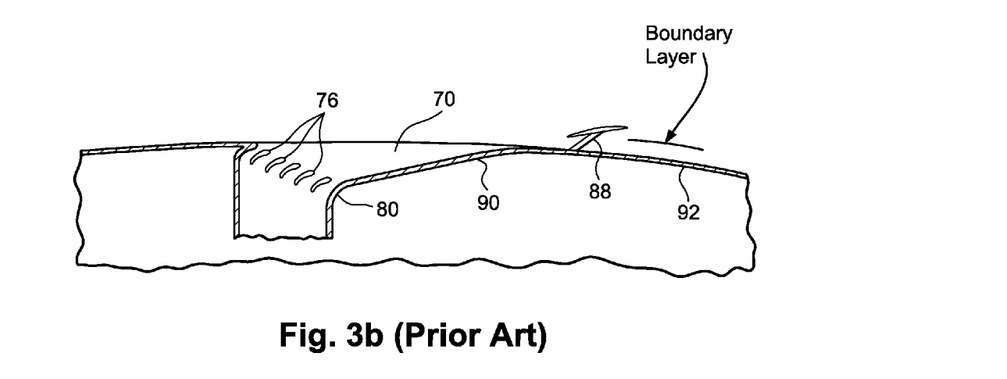

From FIG. 2 and FIG. 3 a critical analysis of the proposed solution can be made. At first, the downwash produced by the fins configuration will not be as strong as in the wing/airfoil configuration, which for a same surface area would have a larger lift-producing region. Despite, the wing/airfoil configuration tends to produce more lift and thus stronger vortexes, the fact that it is to be mounted on a strut will cause the wake of the strut to be ingested by the air inlet. In addition, in both solutions the inlet will ingest at least a portion of the generated vortexes and that will lead to a distorted flow pattern in the inlet duct, which may be unacceptable for some applications that require minimum flow distortion.

U.S. Pat. No. 4,174,083 filed in Apr. 29, 1977, describes a wing-like deflector, which is a VG, that enhances the flow of air into a flush-type, air inlet on the fuselage of an aircraft. The device is mounted on a pedestal attached to the aircraft and positioned outwardly from the fuselage and forwardly of the inlet so as to deflect free stream air flowing past slower-moving boundary layer air adjacent to the fuselage, into the inlet. The device produces counter rotating vortexes, causing a downwash of the airflow behind it and consequently reducing the boundary layer thickness upstream of the inlet and improving its ram recovery ratio and mass flow ratio. The patent document also describes alternative configurations for the VG as the use of trailing edge flap and an actuator to adjust the VG angle of attack.

Figure 4A:
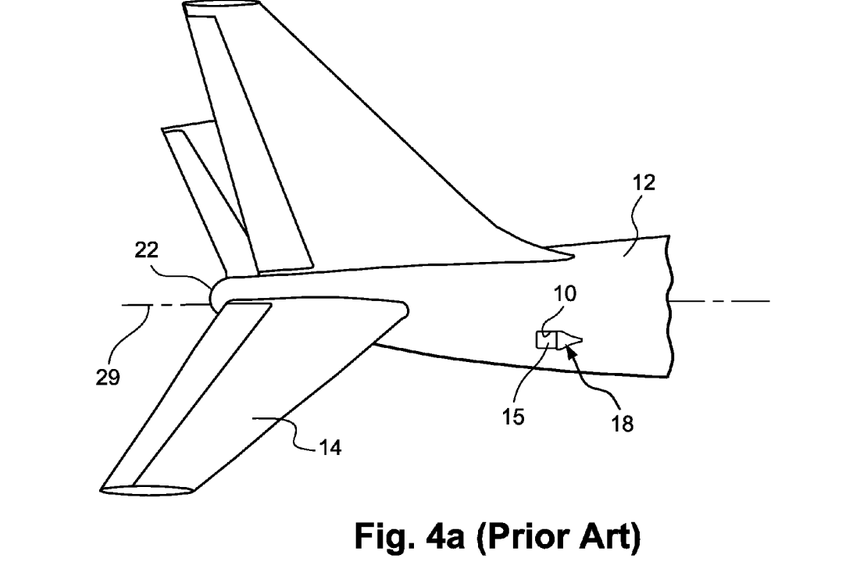
FIG. 4—A wing mounted on a pedestal on the ramp of a flush air inlet of the state of art (U.S. Pat. No. 4,174,083)
Figure 4B:
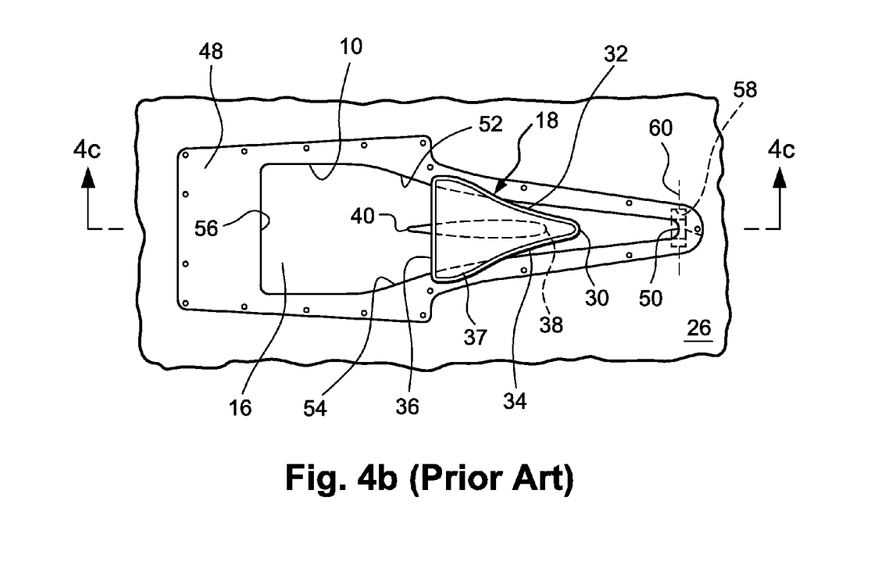
Figure 4C:
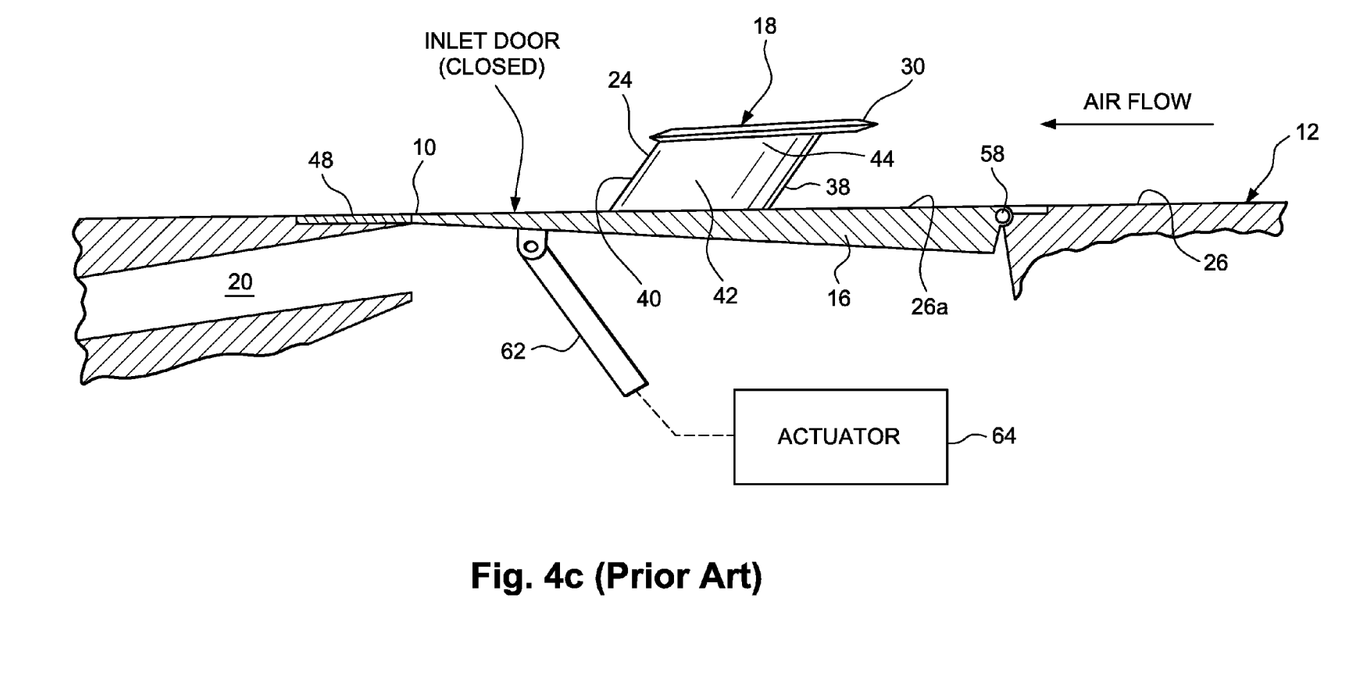
Figure 5A:
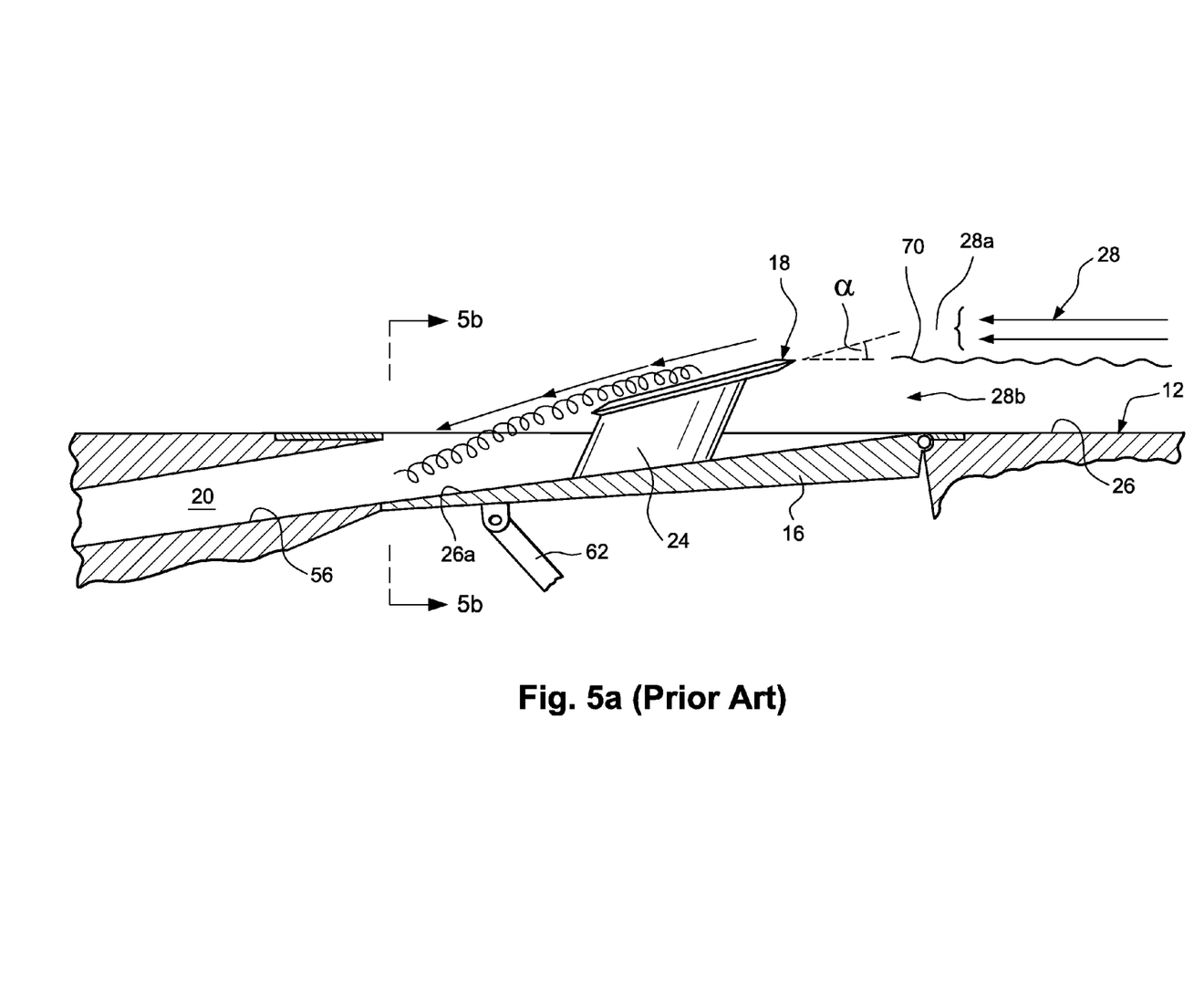
FIG. 5—Details of the vortexes structure of a wing mounted on a pedestal ahead of a flush air inlet of the state of art (U.S. Pat. No. 4,174,083)
Figure 5B:
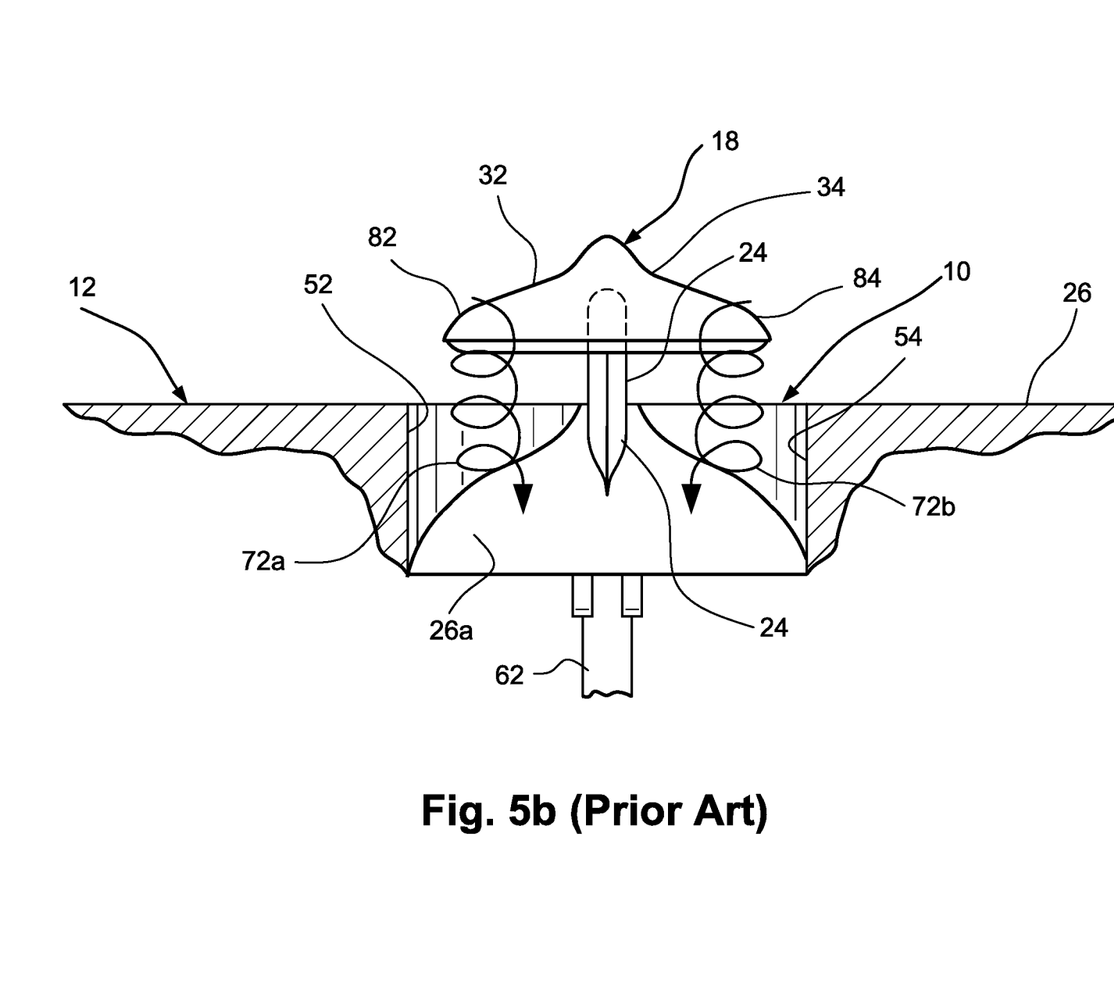
Figure 5C:
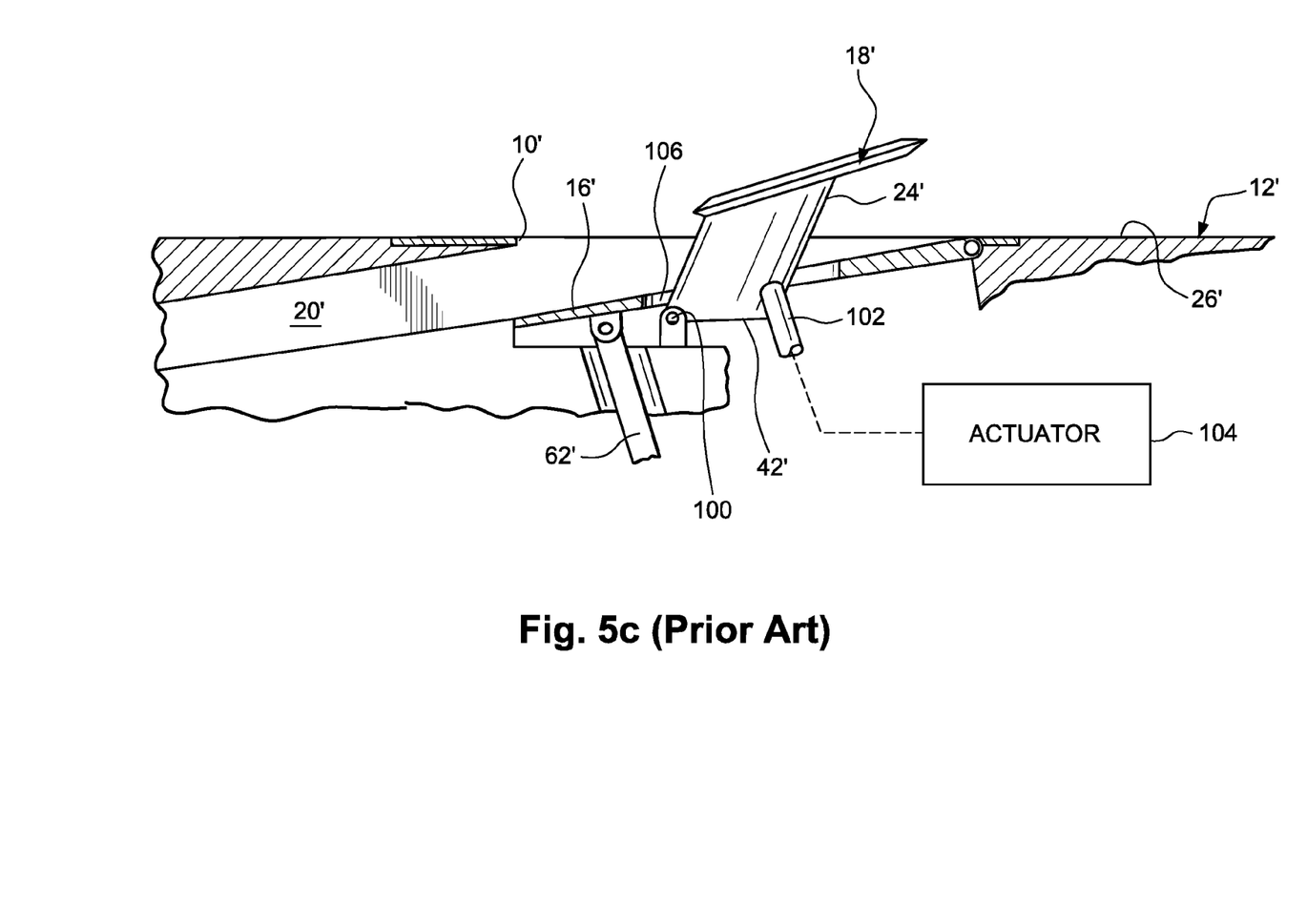

FIG. 4 from the patent document shows the location of the wing-like VG on the aircraft surface and details of the VG geometry, which is mounted on a pedestal on the ramp of a retractable flush air inlet. FIG. 5 shows details of the structure of the vortexes produced by the VG and it can be clearly observed that the vortexes are ingested by the inlet, which may lead to an unacceptable level of flow distortion in some applications. Besides that, another drawback of this solution is the fact that the pedestal generates a wake that is also ingested by the inlet contributing to reduce the amount of high-energy flow ingested and increasing the level of flow distortion.

Figure 6A:
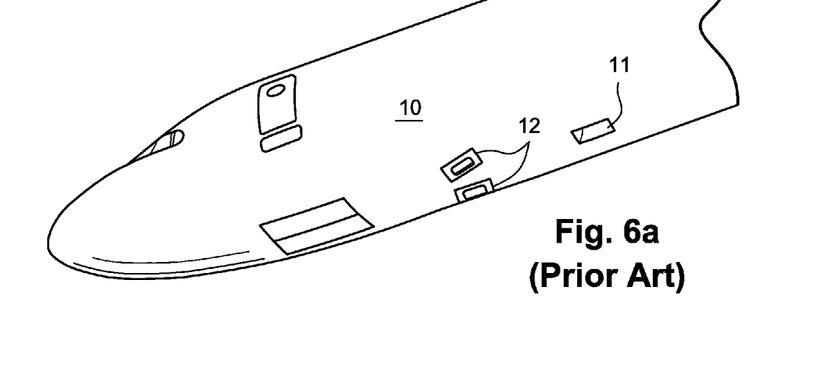
FIG. 6—A pair of fins for generation of counter-rotating vortexes, according to the state of art (U.S. Pat. No. 4,696, 442)
Figure 6B:
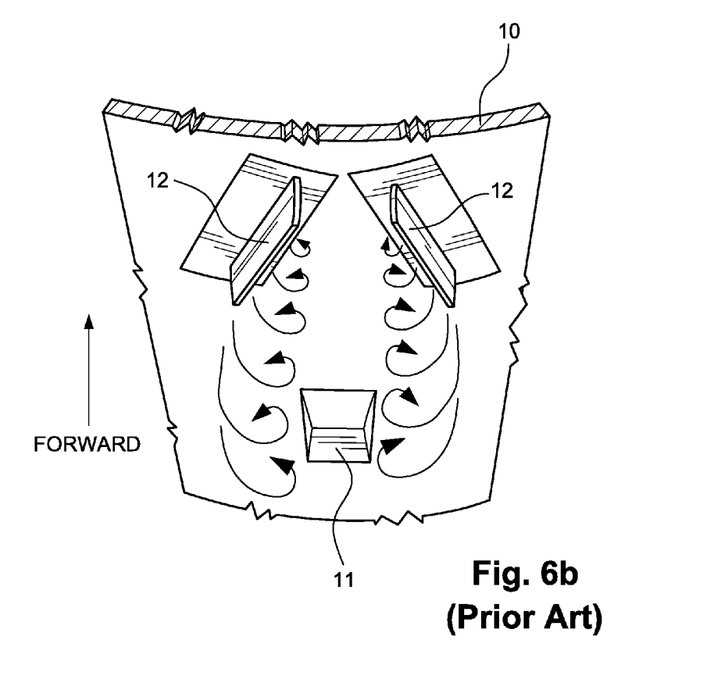

U.S. Pat. No. 4,696,442 filed in Jul. 14, 1986, describes the use of a pair of L or T-shaped fins (or flat plates) mounted normal to an aircraft surface, upstream of a flush air inlet and with a divergent angle as a means of generating vortexes that reduce the boundary layer thickness in front of the air inlet by the same downwash effect mentioned previously. The new aspect of this patent is that the pair of fins generates a pair of counter-rotating vortexes that have a divergent trail in such a way that the vortexes sweep away the boundary layer in front of the air inlet but are not ingested by the inlet. The vortexes create a suction region in front of the air inlet, which is filled by the high-energy freestream flow while the pair of vortexes pass astride the inlet. FIG. 6, from the original patent document U.S. Pat. No. 4,696,442, shows the pair of fins placed on an aircraft surface upstream of a flush air inlet and the structure of the counter-rotating vortexes generated, which are divergently spaced apart, passing astride the air inlet. Although in this case the vortexes are not ingested by the inlet, reducing the flow distortion when compared to the previous solutions, it should be noted that the lift generated by the VGs will not be as large as in the case of a wing or airfoil of the same surface area but placed in the outer edge of the boundary layer, parallel to the aircraft surface. This is because in this solution the low-energy airflow in the boundary layer itself will be used to generate the lift that will eventually generate vortexes, while a wing or airfoil of the same surface area in the outer edge of the boundary layer will produce lift from a high-energy flow and induce stronger vortexes.

DESCRIPTION OF THE INVENTION

The current proposal for a patent consists in a new VG to be placed on a body surface (aircraft or similar), upstream of a flush air inlet, in order to generate vortexes that will sweep away the boundary layer in front of the inlet, inducing a downwash effect in the freestream airflow, and considerably improving the inlet ram recovery ratio and the mass flow ratio.

Figure 7A:
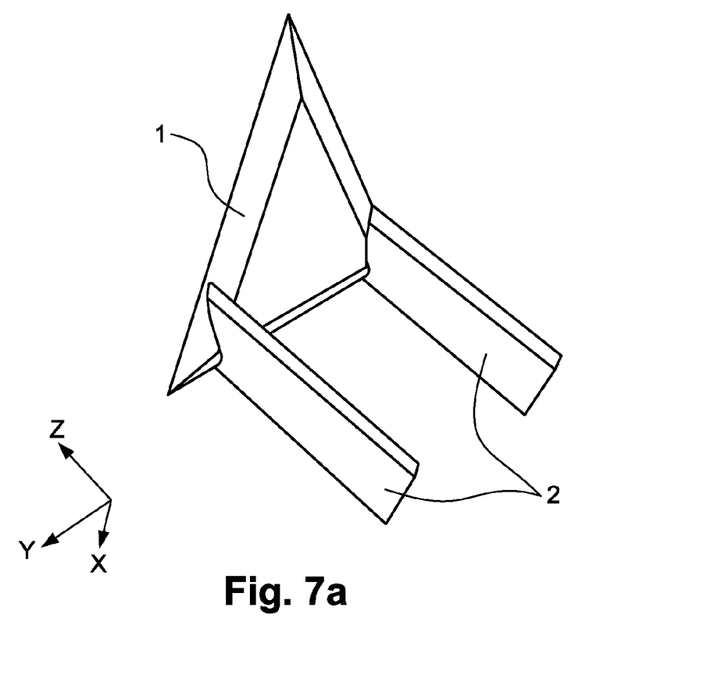
FIG. 7—Three-dimensional views of the new vortex generator of the present invention.
Figure 7B:
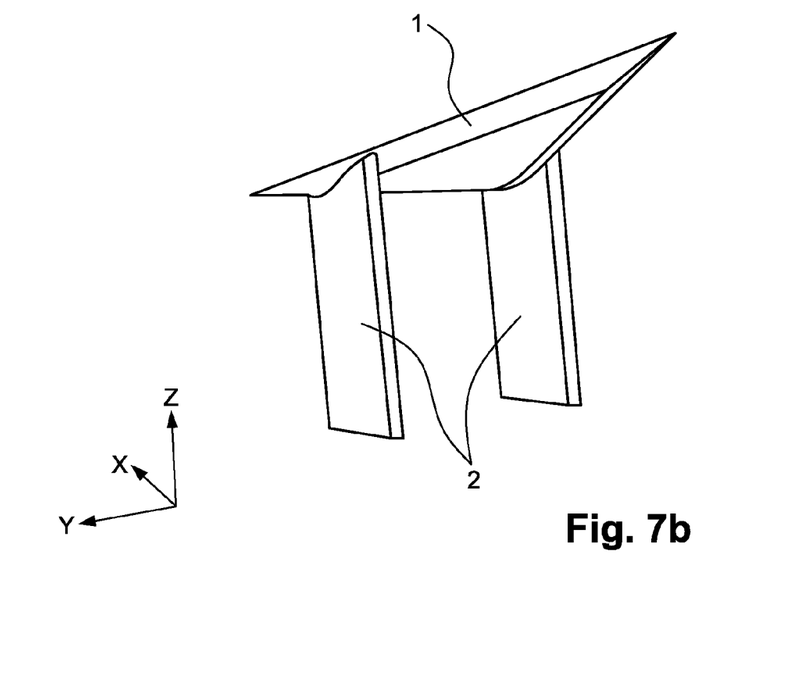
Figure 8:
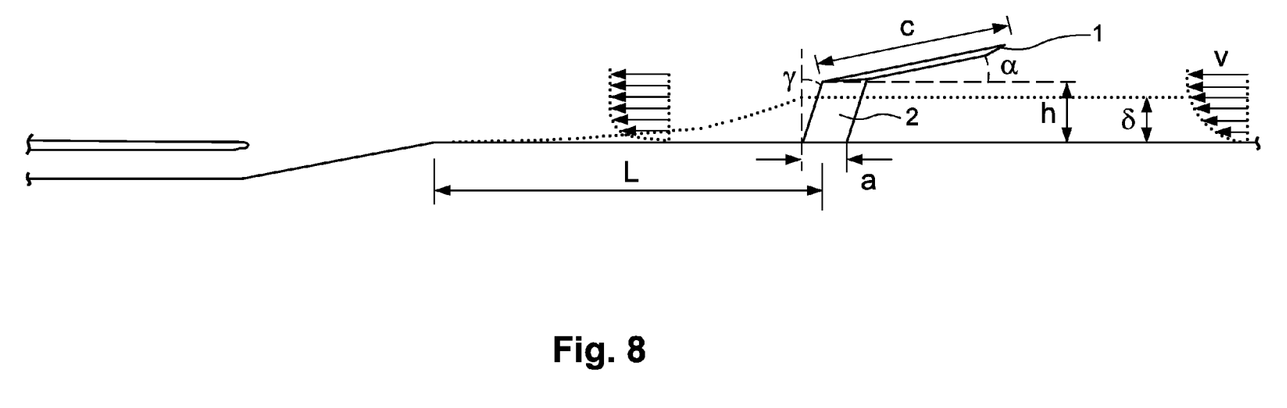
FIG. 8—A side view of the vortex generator of the invention positioned upstream of a flush air inlet.

This proposal is an enhancement of the previously presented solutions as the VG consists in a wing to be placed upstream of a flush air inlet, parallel to the aircraft surface and supported by a pair of divergently angled fin-like supports. FIG. 7 shows three-dimensional views of the VG, with the wing and the supports. The VG positioned upstream of a flush air inlet is displayed in FIG. 8. FIG. 8 also shows schematically the boundary layer thickness reduction effect of the VG. Upstream the VG, it is observed a flat surface on which air is flowing with freestream velocity V and boundary-layer profile indicated by the arrows, with thickness $\delta$. Downstream the VG, it is indicated the increase in velocity values close to the surface and corresponding reduction in boundary layer thickness.

Figure 9:
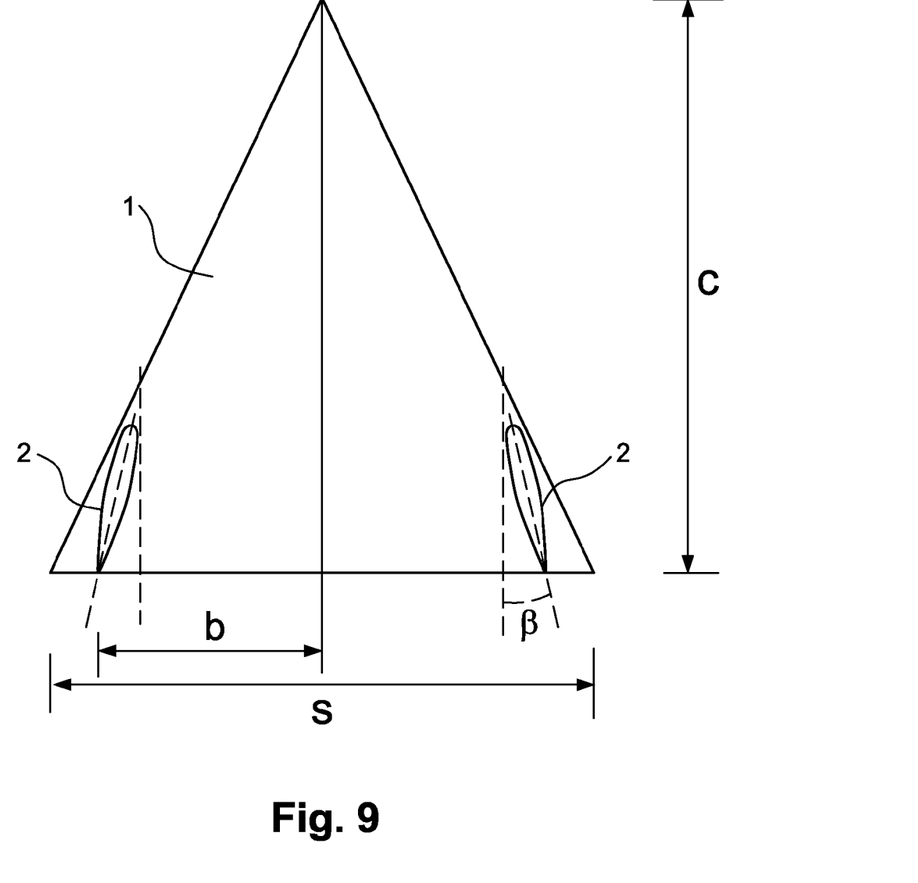
FIG. 9—A top view of the vortex generator of the invention.

The new VG is to be defined by a set of parameters that define the wing and support geometries, along with the relative position between them and relative to the aircraft surface and the flush air inlet. FIG. 8 and FIG. 9 show the main parameters to be used for construction of the new VG.

The wing is characterized by its maximum chord length ('c', at the wing root), its span ('s'), planform shape and profile. The wing aspect ratio is defined as the ratio between the span ('s') and the maximum chord length ('c'). The wing mounting requires the definition of:

(i) A mounting angle ('$\alpha$'), which is measured with respect to the local body tangent plane;

(ii) The vertical separation from the body ('h'), measured in terms of trailing edge distance to the body surface, and (iii) The distance to the inlet ('L'), measured as the distance between the wing trailing edge and the leading edge of the inlet.

During the development of the current VG many variations of such parameters were tested and an optimum configuration of the wing and a corresponding adequate range of the geometric/positioning parameters was identified as it is described in Table 1.

TABLE 1

Geometric and Positioning Parameters for New VG Proposal - Wing Parameters

| | |
|---|---|
| Wing planform | Delta wing of aspect ratio between 0.8 and 3, ideally 1.61; a double delta wing can be used, wing tips may be clipped. |
| Wing section | Either chamfered plates or conventional delta-wing airfoil profiles can be used. |
| Wing span ('s') | The wing span should be at least half and at most twice the inlest throat widht, ideally these dimensions are identical. |
| Wing trailing edge relative height to the body ('h') | The wing trailing edge should be placed at a normal distance to the body surface comprised between 0.5 and 1.2 times the original, undisturbed, boundary layer thickness ('δ'). |
| Wing mounting angle ('α') | It should lie in the linear region of angles of attack for the isolated wing, typical values lying between 15 and 30°, in any case the mounting angle should be at least 5° smaller than the angle of attack for which the maximun lift coefficient is obtained. |
| Wing trailing edge relative position to the air inlet ramp ('L') | The wing trailing edge should be positioned at an upstream location to the inlet such that the combined effect of the wing downwash and the vortexes have completely swept the boundary layer away from the inlet; this is achieved for values of the ratio between this distance and the wing root chord which lie in the range of 3 to 10, a recommended value being 7. |

The geometric/positioning parameters for the supports (2) can be defined by:
(i) Profile shape;
(ii) Local inclination with respect to the body normal;
(iii) Angle with respect to the wing (1) centerline;
(iv) Position with respect to the wing (1) centerline.

Similarly to what was defined for the wing (1), Table 2 describes the optimum support (2) configuration identified and corresponding ranges for its parametric definition.

TABLE 2

Geometric and Positioning Parameters for New VG Proposal - Support Parameters

| | |
|---|---|
| Supports profile | The support profile shape can either be a flat plate or a classic airfoil shape; the shape should be chosen in order to improve the ratio between the strenght of the mounting and the wetted area of the suport. |
| Support inclination ('γ') | The support may be oriented at inclination angles away from the local body normal of plus or minus 10°. |
| Support angle with respect to the wing centerline ('b') | The support is mounted such that it provokes divergence of the downstream flow at angles spanning from 5 to 25° with respect to the wing (1) centerline, the ideal value being 15°. |
| Support lateral spacing | The distance between the support trailing edge and the wing centerline should be maximized; ideally, the ratio between the support distance to the centerline and the wing chord lies between 0.4 and 0.5. |

One of the main advantages of the new VG Proposal when compared to the existing solutions is the fact that it uses a wing (1) positioned close to the outer edge of the boundary layer to generate lift and produce vortexes. The wing (1) is placed upstream of a flush air inlet in such a way that the vortexes generated induce a downwash effect in the freestream airflow, which sweeps away the boundary layer in front of the air inlet, while the vortexes pass astride the flush inlet.

The use of a delta wing (1) maximizes the downwash effect due to its vortex lift generation characteristic. Hence, when compared to the configurations with fin-like VGs, stronger vortexes are generated, which maximizes the amount of downwash air for a given VG surface area. This results in higher ram-recovery ratios and mass-flow ratios for a flush air inlet.

Another aspect is that the distortion level of the flow entering the inlet is reduced as the inlet ingests more freestream air and the vortexes are not ingested by the inlet, as verified in other solutions. This is an important advantage for use in applications that require minimum flow distortion as in rotary machines.

Another benefit of the new VG proposal is the use of a pair of reward divergently angled supports (2). As it was described before, an existing solution that adopts a wing to generate vortexes and improve the performance of a flush air inlet uses also a single pedestal mounted in the centerline of the wing. In that solution, the pedestal generates a wake that is ingested by the air inlet, reducing the benefit from the downwash of the high-energy airflow promoted by the wing.

In the new VG proposal the supports (2) are positioned and angled in such a way that the supports also contribute to generate a downwash effect and thus, instead of disturbing it, the supports increase the global downwash effect of the VG, resulting in a better performance of the air inlet.

The combination of the wing (1) with the pair of reward divergently angled supports (2) results in a simple assembly that can be easily mounted upstream of any flush inlet (not only in aircraft). The supports can be constructed from L or T shaped plates and mounted on a chamfered delta wing. Other classical airfoil profiles can also be used. The delta-wing can be clipped at the tips allowing to the VG, with supports, to be built in a single part. The assembly can be retractable and thus, functional only when required.

The new VG proposal can be used to improve the performance of existing intakes or designed with new inlets to achieve a given performance goal when the available spacing is limited.

In terms of the drag penalty caused by the new VG it was observed to be mostly related to the improved performance of the flush air inlet, being the contribution of the VG a small fraction of the combined drag from the VG and flush air inlet.

The new VG proposal was studied in an application corresponding to a flush air inlet used to ventilate a compartment in an aircraft. A VG consisting of a chamfered section delta-wing (1) along with airfoil shaped and divergently angled supports (2) was placed upstream of a flush air inlet providing gains of more than 50% in ram-recovery ratio and 20% in mass-flow ratio when compared to the baseline flush air inlet, while the VG drag penalty was less than 10% of the combined drag of the VG and flush air inlet.

It was described an example of favorite materialization of the invention, and it should be understood that the scope of the present invention includes other possible variations, and it is only limited by the tenor of the attached claims, comprising its possible equivalents.

The invention claimed is:

1. An aircraft comprising a flush air inlet formed in a surface of the aircraft, and a vortex generator (VG) mounted to the aircraft surface upstream of the flush air inlet to generate vortexes that will sweep away a boundary layer in front of the flush air inlet thereby inducing a downwash effect in a freestream airflow, wherein the VG comprises:

a delta-shaped wing structure; and a pair of laterally spaced apart airfoil-shaped supports each having an upper end connected to the wing structure and a lower end for attachment to the aircraft upstream of the flush air inlet, wherein the supports are oriented with respect to one another so as to diverge in a direction of the freestream airflow into the flush air inlet.

2. The aircraft as in claim 1, wherein the supports are formed of L-shaped or T-shaped plates.

3. The aircraft as in claim 1, wherein the delta-shaped wing structure has a predetermined span, chord length and wing root, the wing structure having a maximum chord length at the wing root, and wherein the wing structure has a wing aspect ratio between the span and the maximum chord length.

4. The aircraft as in claim 3, wherein the delta-shaped wing structure has an aspect ratio between 0.8 and 3, and wherein the span is at least one-half and at most twice a widthwise dimension of an inlet throat of the flush air inlet.

5. The aircraft as in claim 4, wherein the wing structure has a trailing edge, and wherein the supports mount the trailing edge above the aircraft surface at a distance (h) of between 0.5 and 1.2 times an undisturbed boundary layer thickness ($\delta$) of the airflow.

6. The aircraft as in claim 1, wherein the supports are positioned in a divergent orientation so as to establish divergence of downstream airflow at angles from 5 to 25° with respect to a centerline of the wing structure.

7. The aircraft as in claim 1, wherein the wing structure is oriented at a wing mounting angle ($\alpha$) between 15° and 30° relative to the airflow.

8. The aircraft as in claim 7, wherein the wing mounting angle ($\alpha$) is at least 5° smaller than an angle of attach for which a maximum lift coefficient is obtained.

9. The aircraft as in claim 1, wherein the VG is mounted to the aircraft surface upstream of the flush air inlet by a distance L, and wherein a ratio of the distance L to a wing root chord of the delta-shaped wing structure is between 3 to 10.

10. The aircraft as in claim 9, wherein the ratio of the distance L to a wing root chord of the delta-shaped wing structure is 7.

* * * * *